(12) United States Patent
Zhou et al.

(10) Patent No.: US 12,022,190 B2
(45) Date of Patent: Jun. 25, 2024

(54) PHOTOGRAPHING METHOD AND ELECTRONIC DEVICE

(71) Applicant: VIVO MOBILE COMMUNICATION CO., LTD., Guangdong (CN)

(72) Inventors: Ming Zhou, Guangdong (CN); Xuan Hu, Guangdong (CN)

(73) Assignee: Vivo Mobile Communication Co., Ltd., Guangdong (CN)

(*) Notice: Subject to any disclaimer, the term of this patent is extended or adjusted under 35 U.S.C. 154(b) by 148 days.

(21) Appl. No.: 17/742,553

(22) Filed: May 12, 2022

(65) Prior Publication Data
US 2022/0272275 A1 Aug. 25, 2022

Related U.S. Application Data
(63) Continuation of application No. PCT/CN2020/131021, filed on Nov. 24, 2020.

(30) Foreign Application Priority Data
Nov. 28, 2019 (CN) .......................... 201911190969.9

(51) Int. Cl.
H04N 23/67 (2023.01)
H04N 23/61 (2023.01)
H04N 23/63 (2023.01)

(52) U.S. Cl.
CPC ........... H04N 23/675 (2023.01); H04N 23/61 (2023.01); H04N 23/631 (2023.01)

(58) Field of Classification Search
CPC .... H04N 23/675; H04N 23/61; H04N 23/631; H04N 23/62; H04N 23/69; H04N 23/60; H04N 23/617; H04N 23/632
See application file for complete search history.

(56) References Cited

U.S. PATENT DOCUMENTS

| 5,721,967 A | 2/1998 | Akashi | |
| 2007/0285528 A1* | 12/2007 | Mise | H04N 23/61 348/222.1 |
| 2008/0199056 A1* | 8/2008 | Tokuse | H04N 23/61 382/118 |
| 2012/0013786 A1* | 1/2012 | Yasuda | H04N 23/635 348/349 |

(Continued)

FOREIGN PATENT DOCUMENTS

| CN | 102447828 A | 5/2012 |
| CN | 104065878 A | 9/2014 |

(Continued)

Primary Examiner — Abdelaaziz Tissire
(74) Attorney, Agent, or Firm — Price Heneveld LLP

(57) ABSTRACT

A photographing method applied to an electronic device is provided. The electronic device includes a plurality of cameras. The method includes: receiving a first touch-control input; acquiring a movement speed of a first target object in response to the first touch-control input, the first target object being a moving object in a photography preview interface; acquiring a target photographic magnification factor set based on the movement speed, the target photographic magnification factor set including a plurality of photographic magnification factors; and taking a plurality of photos based on the target photographic magnification factor set.

15 Claims, 5 Drawing Sheets

(56) References Cited

U.S. PATENT DOCUMENTS

| | | | |
|---|---|---|---|
| 2014/0354781 A1* | 12/2014 | Matsuyama | H04N 25/134 |
| | | | 348/49 |
| 2015/0156399 A1 | 6/2015 | Chen et al. | |
| 2015/0163413 A1* | 6/2015 | Ikeda | H04N 23/62 |
| | | | 348/240.99 |
| 2015/0213305 A1* | 7/2015 | Sundstrom | G06F 16/58 |
| | | | 382/118 |
| 2016/0381289 A1 | 12/2016 | Kim et al. | |
| 2017/0034421 A1* | 2/2017 | Yamazaki | H04N 23/80 |
| 2020/0120268 A1 | 4/2020 | Osawa et al. | |
| 2020/0275026 A1 | 8/2020 | Chen | |

FOREIGN PATENT DOCUMENTS

| | | |
|---|---|---|
| CN | 104683685 A | 6/2015 |
| CN | 104780315 A | 7/2015 |
| CN | 105827951 A | 8/2016 |
| CN | 107770451 A | 3/2018 |
| CN | 110121881 A | 8/2019 |
| CN | 110944114 A | 3/2020 |
| JP | 2017085438 A | 5/2017 |
| JP | 2019003075 A | 1/2019 |
| JP | 2018207287 A1 | 11/2019 |
| WO | 2012001947 A1 | 1/2012 |
| WO | 2013190880 A1 | 12/2013 |

\* cited by examiner

PHOTOGRAPHING METHOD AND ELECTRONIC DEVICE

CROSS-REFERENCE TO RELATED APPLICATIONS

This application is continuation application of PCT International Application No. PCT/CN2020/131021 filed on Nov. 24, 2020, which claims priority to Chinese Patent Application No. 201911190969.9 filed in China on Nov. 28, 2019, which are incorporated herein by reference in their entireties.

TECHNICAL FIELD

Embodiments of the present disclosure relate to the field of electronic device technologies, and in particular, to a photographing method and an electronic device.

BACKGROUND

Currently, taking photos by a user using an electronic device generally includes the following steps: (1) turning on a camera; (2) selecting an appropriate zooming factor; and (3) clicking a photographing key to take a photo. However, in actual application scenarios, there are usually pictures that need to be captured, such as a running animal, a passing pedestrian, and a water surface blown by a breeze. These pictures exist for a very short time. If an existing photographing method is adopted, usually, when the user performs the above operation steps, an optimal photographing timing has been missed, resulting in failing to take satisfactory photos.

SUMMARY

According to a first aspect, an embodiment of the present disclosure provides a photographing method applied to an electronic device, where the electronic device includes a plurality of cameras, and the method includes:
 receiving a first touch-control input;
 acquiring a movement speed of a first target object in response to the first touch-control input, the first target object being a moving object in a photography preview interface;
 acquiring a target photographic magnification factor set based on the movement speed, the target photographic magnification factor set including a plurality of photographic magnification factors; and
 taking a plurality of photos based on the target photographic magnification factor set, the plurality of photos being respectively corresponding to the plurality of photographic magnification factors in the target photographic magnification factor set.

According to a second aspect, an embodiment of the present disclosure provides an electronic device, where the electronic device includes a plurality of cameras, and includes:
 a receiving module, configured to receive a first touch-control input;
 a first acquiring module, configured to acquire a movement speed of a first target object in response to the first touch-control input, the first target object being a moving object in a photography preview interface;
 a second acquiring module, configured to acquire a target photographic magnification factor set based on the movement speed, the target photographic magnification factor set including a plurality of photographic magnification factors; and
 a photographing module, configured to take a plurality of photos based on the target photographic magnification factor set, the plurality of photos being respectively corresponding to the plurality of photographic magnification factors in the target photographic magnification factor set.

According to a third aspect, an embodiment of the present disclosure provides an electronic device, including a processor, a memory, and a program stored on the memory and executable on the processor, the program, when executed by the processor, implementing steps of the photographing method according to the first aspect.

According to a fourth aspect, an embodiment of the present disclosure provides a computer-readable storage medium, storing a computer program thereon, the computer program, when executed by a processor, implementing steps of the photographing method according to the first aspect.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the disclosed embodiments without creative efforts shall fall within the protection scope of the present disclosure.

In the embodiments of the present disclosure, the word such as "exemplarily" or "for example" is used to mean serving as an example, an illustration, or a description. Any embodiment or design scheme described as "exemplarily" or "for example" in the embodiments of the present disclosure should not be construed as being preferred or superior to other embodiments or design schemes. To be specific, the use of the word such as "exemplarily" or "for example" is intended to present the related concepts in a specific manner.

Relational terms such as "first" and "second" are merely used to distinguish between the same names, rather than to imply a relationship or an order between these names.

In the embodiments of the present disclosure, an electronic device may be a mobile phone, a tablet computer, a laptop computer, an ultra-mobile personal computer (UMPC), a netbook, a personal digital assistant (PDA), or the like.

The electronic device includes a plurality of cameras. Photographic magnification factors of the cameras may be the same as or different from each other. For example, the electronic device is an electronic device with two cameras, and the two cameras are respectively a wide-angle (wide) camera and a telephoto (tele) camera. It can be understood that, the number of cameras of the electronic device may alternatively be three, four, or the like, and the number of cameras of the electronic device is not specifically limited in the embodiments of the present disclosure.

Figure 1:
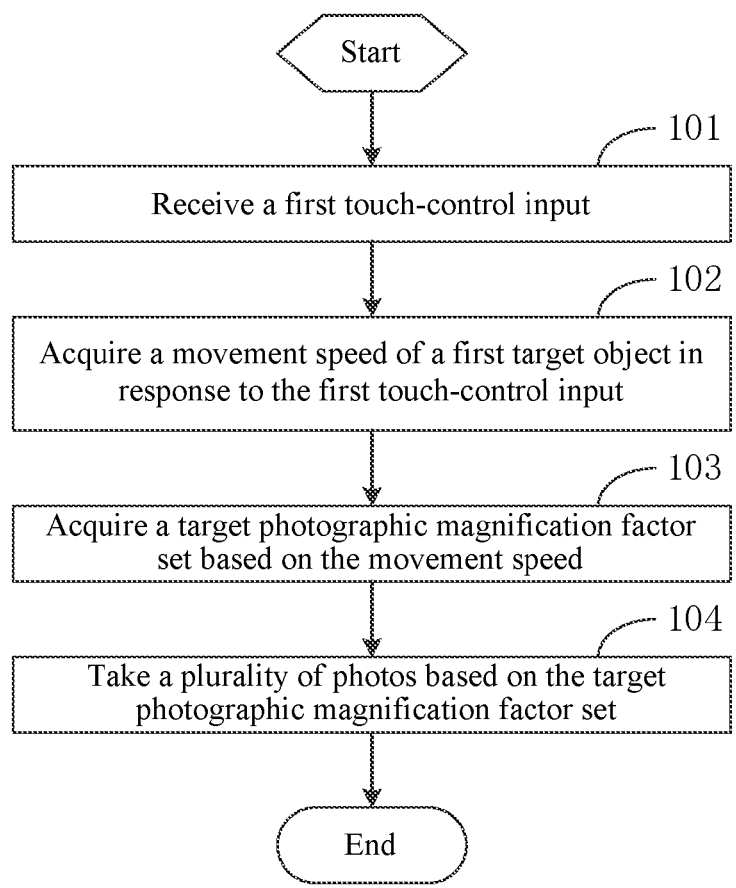
FIG. 1 is a first schematic flow chart of a photographing method according to an embodiment of the present disclosure.

Referring to FIG. 1, an embodiment of the present disclosure provides a photographing method, the method is performed by an electronic device, the electronic device includes a plurality of cameras, and specific steps of the method are as follows:

Step 101: Receive a first touch-control input.

In this embodiment of the present disclosure, the first touch-control input is used for instructing the electronic device to use the photographing method of this embodiment of the present disclosure. For example, the photographing method of this embodiment of the present disclosure is set to a "fast photographing mode", and a user turns on the "fast photographing mode" by the first touch-control input.

Figure 2A:
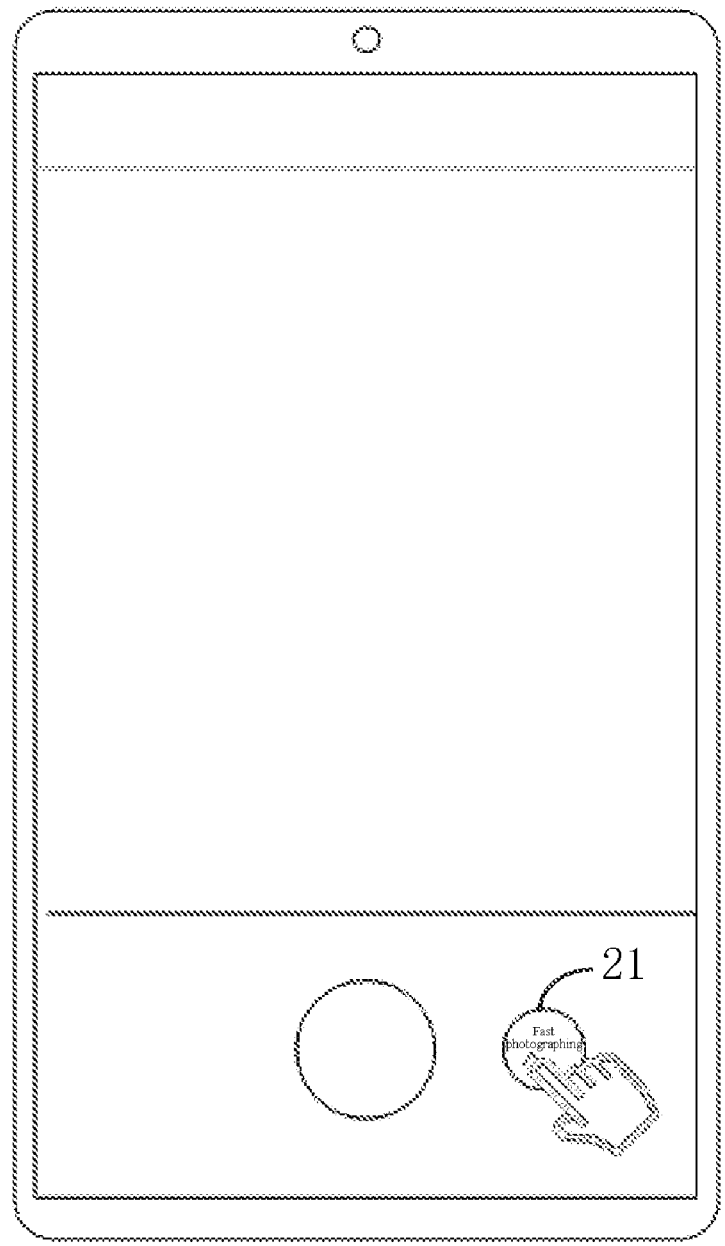
FIG. 2a is a first schematic diagram of an application scenario according to an embodiment of the present disclosure.

The above first touch-control input may be a touch-control input acting on a virtual control when the electronic device is in a screen-on state. Referring to FIG. 2a, a virtual control 21 may be set in a photography preview interface. When the user needs to use the photographing method of this embodiment of the present disclosure, the first touch-control input is performed on the virtual control 21, and correspondingly, the electronic device takes a photo using the photographing method of this embodiment of the present disclosure.

Figure 2B:
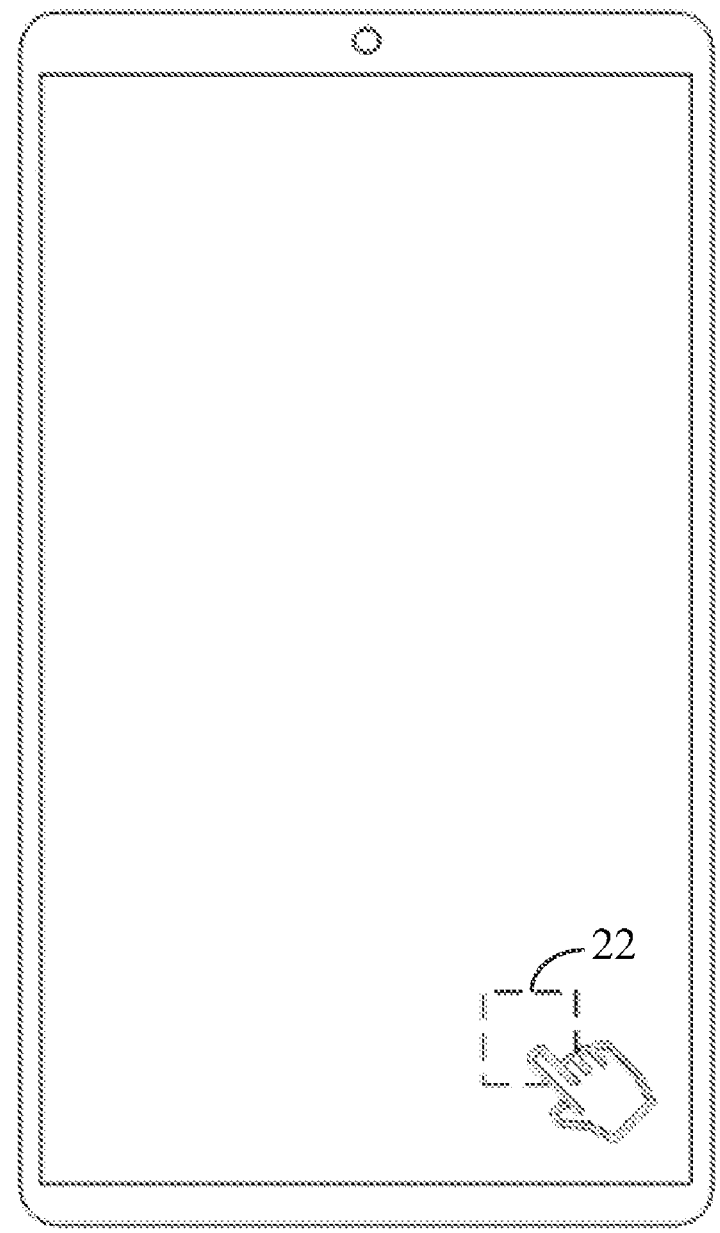
FIG. 2b is a second schematic diagram of an application scenario according to an embodiment of the present disclosure.

The above first touch-control input may alternatively be a touch-control input acting on a target region of a screen when the electronic device is in a screen-off state. Referring to FIG. 2b, a target region 22, that is, a region framed by dotted lines in the figure may be preset in the screen. It can be understood that, FIG. 2b shows a case that the target region 22 has a rectangular shape. The target region 22 may alternatively have another shape such as a circle, a rhombus, or an irregular shape. The specific shape of the target region 22 is not limited in this embodiment of the present disclosure. When the user needs to use the photographing method of this embodiment of the present disclosure, the first touch-control input is performed on the target region 22, and correspondingly, the electronic device turns on the photography preview interface, and uses the photographing method of this embodiment of the present disclosure to take a photo.

Optionally, a position of the target region 22 is the same as a position of the virtual control 21 in the screen in FIG. 2a, so that action positions of the first touch-control input are the same when the electronic device is in the screen-off and screen-on states, which makes it easier for the user to operate.

It should be noted that, gestures of the first touch-control input may be various, for example, click, double-click, press and hold, and the like. The gestures may be preset by the electronic device or may be set by the user. The gestures of the first touch-control input are not specifically limited in this embodiment of the present disclosure.

Step 102: Acquire a movement speed of a first target object in response to the first touch-control input.

In the embodiments of the present disclosure, the first target object is a moving object in the photography preview interface, the movement speed of the first target object can be obtained through an existing speed detection method, and the specific method for obtaining the movement speed of the first target object is not limited in this embodiment of the present disclosure.

There may be one or more moving objects in the photography preview interface, and therefore it is necessary to select a first target object from these moving objects as a reference.

Specifically, an embodiment of the present disclosure provides a process for selecting the first target object, including the following sub-steps:

(1) In a case that there is one moving object, select the moving object as the first target object.

In this embodiment of the present disclosure, if there is only one moving object in the photography preview interface, the moving object is directly selected as the first target object.

(2) In a case that there are a plurality of moving objects, detect a distance between each of the moving objects and the electronic device, and select a moving object with a minimum distance from the electronic device as the first target object.

In this embodiment of the present disclosure, for the case that there are a plurality of moving objects in the photography preview interface, a moving object with a minimum distance from the electronic device is selected as the first target object. It can be understood that, the closer the moving object is to the electronic device, the faster the position of the moving object in the photography preview interface is changed at the same movement speed, and therefore a moving object with a minimum distance from the electronic device needs to be taken as a reference.

It should be noted that, the detection of a distance between each of the moving objects and the electronic device can be realized by an existing distance detection method, and the method for detecting the distance between the moving object and the electronic device is not specifically limited in this embodiment of the present disclosure.

(3) In a case that there are a plurality of moving objects, select each moving object as the first target object.

In this embodiment of the present disclosure, all of the moving objects are selected as the first target object, and each of the moving objects is photographed separately during the subsequent continuous photographing based on the target photographic magnification factor set. Correspondingly, during the continuous photographing, different moving objects may correspond to different photographic magnification factors, for example, the moving object with a longer distance from the electronic device is photographed using a larger photographic magnification factor, and the moving object with a shorter distance from the electronic device is photographed using a smaller photographic magnification factor to ensure that each moving object can be photographed clearly.

Step 103: Acquire a target photographic magnification factor set based on the movement speed.

It can be understood that, by controlling a camera to focus, the photographing can be performed at a plurality of photographic magnification factors. In this embodiment of the present disclosure, a corresponding target photographic magnification factor set is obtained based on the movement speed of the first target object, the target photographic magnification factor set includes a plurality of photographic magnification factors, and the camera can perform continuous photographing at different photographic magnification factors based on the target photographic magnification factor set. For example, if the target photographic magnification factor set is {1×, 5×, 9×}, the electronic device takes three photos at a photographic magnification factor 1×, a photographic magnification factor 5×, and a photographic magnification factor 9×, respectively.

Specifically, a target photographic magnification factor set corresponding to the speed range is obtained based on a speed range in which the movement speed is located. The movement speed is negatively correlated with the number of photographic magnification factors in the target photographic magnification factor set, and the movement speed is negatively correlated with a maximum magnification factor in the target photographic magnification factor set.

It should be noted that, if the movement speed of the first target object is relatively high, the first target object may move out of the photography preview interface in a quite short time, that is, move out of the field of view of the camera. In this case, a smaller photographic magnification factor and a smaller number of photos to be taken shall be selected, thereby avoiding still taking photos when the first target object moves out of the photography preview interface. Correspondingly, if the movement speed of the first target object is relatively low, a larger photographic magnification factor and a larger number of photos to be taken may be selected, to obtain photos at as many photographic magnification factors as possible before the first target object moves out of the photography preview interface for the user to select.

For example, a first speed threshold, a second speed threshold, and a third speed threshold may be preset, where the first speed threshold is less than the second speed threshold, and the second speed threshold is less than the third speed threshold;

(1) when the movement speed of the first target object is less than the first speed threshold, the target photographic magnification factor set is {1×, 2×, 3×, 4×, 5×, 6×, 7×, 8×, 9×, 10×};

(2) when the movement speed of the first target object is between the first speed threshold and the second speed threshold, the target photographic magnification factor set is {1×, 3×, 5×, 7×, 9×};

(3) when the movement speed of the first target object is between the second speed threshold and the third speed threshold, the target photographic magnification factor set is {1×, 5×, 9×}; and (4) when the movement speed of the first target object is greater than the third speed threshold, the target photographic magnification factor set is {1×, 5×}.

It can be understood that, the target photographic magnification factor set corresponding to the speed range may be preset by the electronic device or may be set by the user. The specific numerical value of the target photographic magnification factor set corresponding to the speed range is not limited in this embodiment of the present disclosure.

Step 104: Take a plurality of photos based on the target photographic magnification factor set.

In this embodiment of the present disclosure, based on the photographic magnification factor in the target photographic magnification factor set, continuous photographing is performed to obtain a plurality of photos at the photographic magnification factor. The user can select satisfactory photos from these photos.

In this embodiment of the present disclosure, the target photographic magnification factor set including a plurality of photographic magnification factors is acquired based on the movement speed of the first target object in the photography preview interface, and a plurality of photos are taken based on the target photographic magnification factor set. In this way, as long as the user performs a touch-control input, the electronic device will automatically take photos at a plurality of photographic magnification factors, which avoids missing an optimal photographing timing and enables the user to take satisfactory photos.

Figure 3:
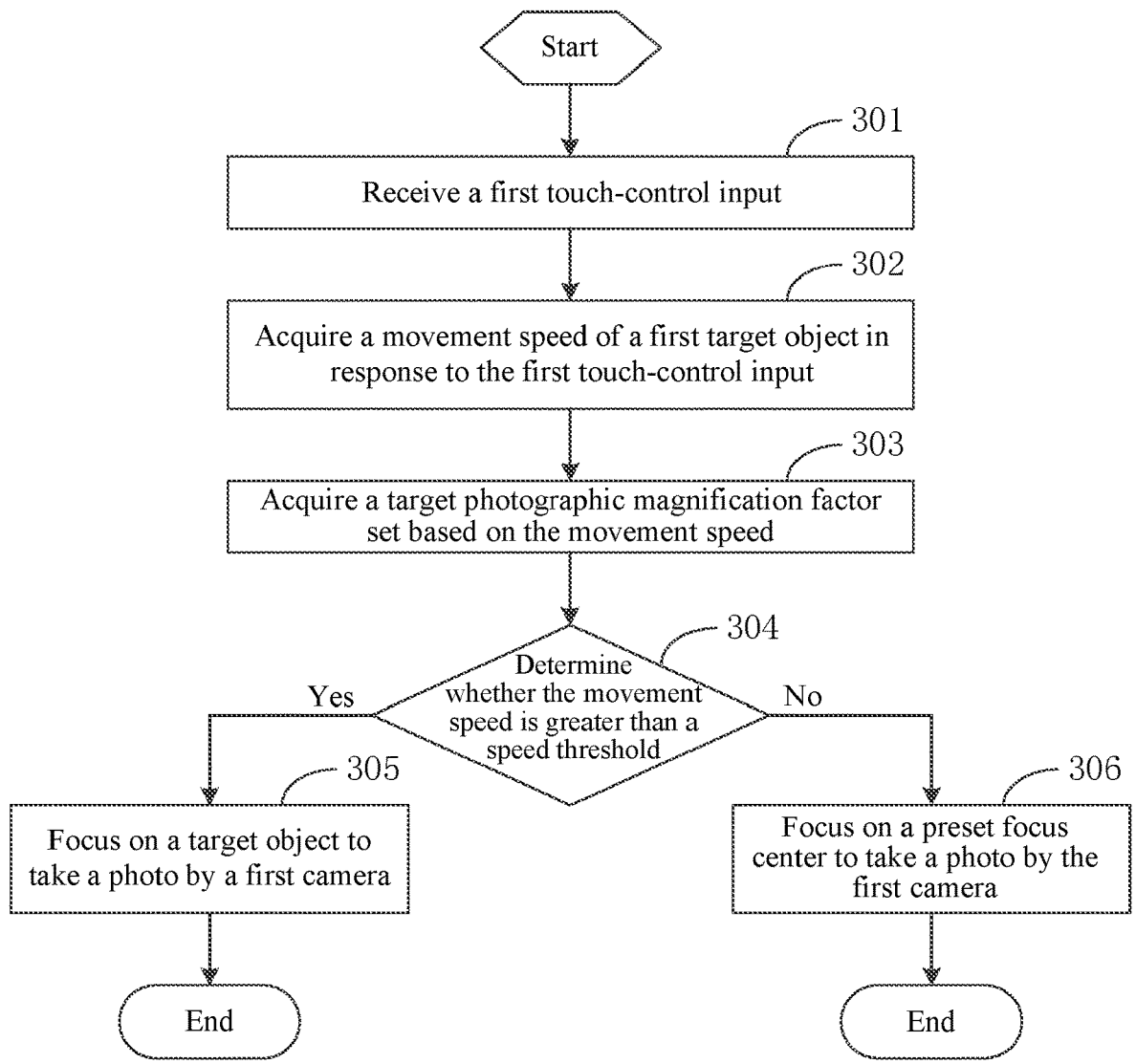
FIG. 3 is a second schematic flow chart of a photographing method according to an embodiment of the present disclosure.

Referring to FIG. 3, an embodiment of the present disclosure provides a photographing method, the method is performed by an electronic device, the electronic device includes a plurality of cameras, and specific steps of the method are as follows:

Step 301: Receive a first touch-control input;

Step 302: Acquire a movement speed of a first target object in response to the first touch-control input;

Step 303: Acquire a target photographic magnification factor set based on the movement speed;

For the description of steps 301 to 303 above, reference may be made to the description of steps 101 to 103 shown in FIG. 1, and details are not described herein again.

Step 304: Determine whether the movement speed is greater than a speed threshold. If the movement speed is greater than the speed threshold, step 305 is performed; otherwise, step 306 is performed;

Step 305: Focus on a target object to take a photo by a first camera; and

Step 306: Focus on a preset focus center to take a photo by the first camera.

In this embodiment of the present disclosure, taking into account the need to focus when taking a photo, in a case that the movement speed of the first target object is relatively low, the preset focus center may be focused on to take a photo, for example, a center of the photography preview interface may be focused on to take a photo; and in a case that the movement speed of the first target object is relatively high, the first target object is focused on to take a photo in order to prevent the first target object from being unclearly photographed.

The speed threshold described above may be a speed threshold that is set when the target photographic magnification factor set is acquired based on the movement speed. For example, a first speed threshold, a second speed threshold, and a third speed threshold are preset, where the first speed threshold<the second speed threshold<the third speed threshold, and when a focus position is selected, the first speed threshold is used as a basis for determination.

The first camera described above refers to a camera matching the target photographic magnification factor set in the plurality of cameras of the electronic device. It can be understood that, for the electronic device with a plurality of cameras, the photographic magnification factors of the cameras may be different. Some cameras may have a larger photographic magnification factor to cope with high-magnification photography scenarios, and some cameras may have a smaller photographic magnification factor to cope with low-magnification photography scenarios. After a corresponding target photographic magnification factor set is obtained based on the movement speed of the first target object, a corresponding first camera is selected to focus and take a photo based on a maximum photographic magnification factor in the target photographic magnification factor set.

In steps 304 to 306, the electronic device determines the focus position based on the movement speed of the first target object. In some implementations, the electronic device may alternatively determine the focus position based on a touch-control input of the user. Specifically, a second touch-control input in the photography preview interface is received, and in response to the second touch-control input, a target region is determined based on an input position of the second touch-control input in the photography preview interface; and the target region is focused on to take a photo by the first camera.

In this embodiment of the present disclosure, the second touch-control input may be click, double-click, press and hold, or the like, which is not specifically limited in this embodiment of the present disclosure. The target region is determined based on the action position of the second touch-control input in the photography preview interface. For example, a target region having a fixed area is determined by centering on the coordinates of the action position of the second touch-control input in the photography preview interface, the region may be rectangular, circular, or the like, and the target region is focused on to take a photo by the first camera.

It should be noted that, the method for determining the focus position by the electronic device based on the movement speed of the first target object, and the method for determining the focus position by the electronic device based on the touch-control input of the user can be combined with each other. For example, the movement speed of the first target object is less than the first speed threshold, a target photographic magnification factor set obtained correspondingly is {1×, 2×, 3×, 4×, 5×, 6×, 7×, 8×, 9×, 10×}, and the focus position is the center of the photography preview interface. When the continuous photographing is performed to the photographic magnification factor 5×, the user performs the second touch-control input on the photography preview interface (the action position is a position other than the center of the photography preview interface). In this case, the electronic device re-determines the focus position based on the action position of the second touch-control input in the photography preview interface, and uses the first camera to focus on the newly determined focus position to take a photo, that is, to focus on the newly determined focus position to take photos at the photographic magnification factors 6×, 7×, 8×, 9×, and 10×.

Further, the method of this embodiment of the present disclosure further includes the following steps:

(1) in a case that the first camera performs the focusing and photographing, detecting, by at least one second camera, whether a second target object exists; and (2) in the case that the at least one second camera detects the second target object, focusing on the second target object to take a photo by the first camera.

In this embodiment of the present disclosure, the second target object is a moving object in the photography preview interface, and a distance between the second target object and the electronic device is less than a distance between the first target object and the electronic device.

Taking into account that during the continuous photographing process of the first camera, a new moving object may enter the photography preview interface, and compared with the determined target object, the new moving object is closer to the electronic device. In this case, in order to ensure the quality of the photographing, the new moving object should be taken as the target object to be focused on to take a photo.

Specifically, because the electronic device includes a plurality of cameras, when the first camera performs the focusing and photographing, at least one second camera detects whether the second target object exists, and the at least one second camera is a camera other than the first camera in the plurality of cameras of the electronic device. For the method for detecting whether the second target object exists by the second camera, reference may be made to the foregoing description of selecting the first target object from the plurality of moving objects, and details are not described herein again.

Taking a dual-camera electronic device as an example for description, the electronic device includes two cameras, which are a wide-angle (wide) camera and a telephoto (tele) camera. When the tele camera is taking a photo, the wide camera detects, in real time, whether the second target object exists. If it is detected that a new target object moves at a speed greater than or equal to a set threshold of 1, the tele camera then focuses on the target again to take a photo.

In this embodiment of the present disclosure, the target photographic magnification factor set including a plurality of photographic magnification factors is acquired based on the movement speed of the first target object in the photography preview interface, the focus position is determined based on the movement speed of the first target object, and a plurality of photos are taken based on the target photographic magnification factor set. In this way, as long as the user performs a touch-control input, the electronic device will automatically take photos at a plurality of photographic magnification factors, which avoids missing an optimal photographing timing and enables the user to take satisfactory photos.

Figure 4:
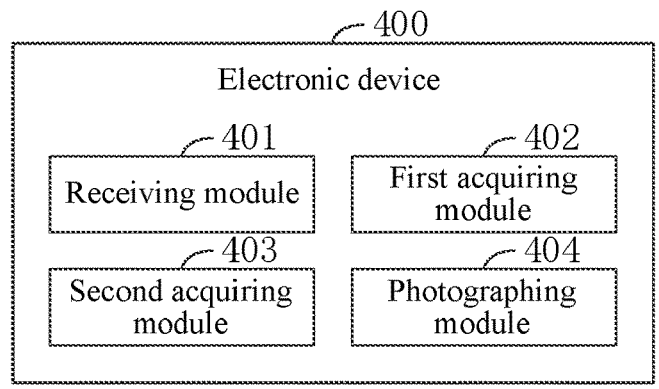
FIG. 4 is a first schematic structural diagram of an electronic device according to an embodiment of the present disclosure.

Referring to FIG. 4, an embodiment of the present disclosure provides an electronic device 400, the electronic device 400 includes a plurality of cameras, and the electronic device 400 further includes:

a receiving module 401, configured to receive a first touch-control input;

a first acquiring module 402, configured to acquire a movement speed of a first target object in response to the first touch-control input, the first target object being a moving object in a photography preview interface;

a second acquiring module 403, configured to acquire a target photographic magnification factor set based on the movement speed, the target photographic magnification factor set including a plurality of photographic magnification factors; and a photographing module 404, configured to take a plurality of photos based on the target photographic magnification factor set, the plurality of photos being respectively corresponding to the plurality of photographic magnification factors in the target photographic magnification factor set.

Optionally, the second acquiring module 403 includes:

a first acquiring unit, configured to acquire, based on a speed range in which the movement speed is located, a target photographic magnification factor set corresponding to the speed range.

The movement speed is negatively correlated with the number of photographic magnification factors in the target photographic magnification factor set, and the movement speed is negatively correlated with a maximum magnification factor in the target photographic magnification factor set.

Optionally, the first acquiring module includes:

a first acquiring unit, configured to, in a case that there is one moving object, select the moving object as the first target object and acquire a movement speed of the first target object; and a second acquiring unit, configured to, in a case that there are a plurality of moving objects, detect a distance between each of the moving objects and the electronic device, select a moving object with a minimum distance from the electronic device as the first target object, and acquire a movement speed of the first target object.

Optionally, the electronic device includes a plurality of cameras; and the photographing module 404 includes:

a first photographing unit, configured to, in a case that the movement speed is less than a speed threshold, focus on a preset focus center to take a photo by a first camera; and a second photographing unit, configured to, in a case that the movement speed is not less than the speed threshold, focus on the target object to take a photo by the first camera.

The first camera is a camera matching the target photographic magnification factor set in the plurality of cameras.

Optionally, the photographing module 404 includes:

a receiving unit, configured to receive a second touch-control input in the photography preview interface;

a determining unit, configured to, in response to the second touch-control input, determine a target region based on an input position of the second touch-control input in the photography preview interface; and a third photographing unit, configured to focus on the target region to take a photo by the first camera.

Optionally, the electronic device further includes:

a detection module, configured to, in a case that the focusing and photographing are performed by the first camera, detect whether a second target object exists by at least one second camera, the second target object being a moving object in the photography preview interface, and a distance between the second target object and the electronic device being less than a distance between the first target object and the electronic device; and the photographing module 404 being further configured to, in a case that the at least one second camera detects the second target object, focus on the second target object to take a photo by the first camera.

The second camera is a camera other than the first camera in the plurality of cameras.

In this embodiment of the present disclosure, the target photographic magnification factor set including a plurality of photographic magnification factors is acquired based on the movement speed of the first target object in the photography preview interface, and a plurality of photos are taken based on the target photographic magnification factor set. In this way, as long as the user performs a touch-control input, the electronic device will automatically take photos at a plurality of photographic magnification factors, which avoids missing an optimal photographing timing and enables the user to take satisfactory photos.

Figure 5:
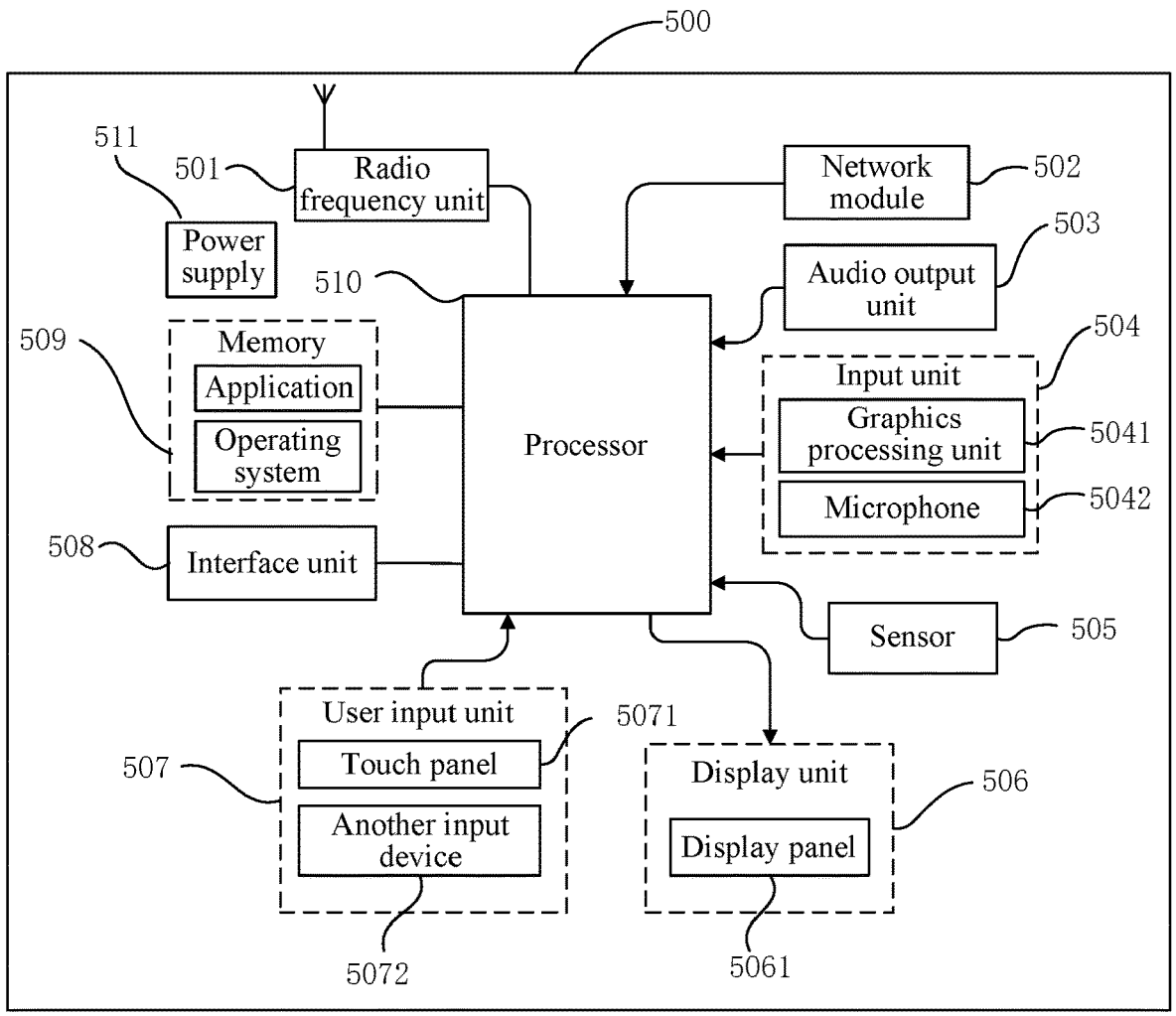
FIG. 5 is a second schematic structural diagram of an electronic device according to an embodiment of the present disclosure.

FIG. 5 is a schematic diagram of a hardware structure of an electronic device for implementing the embodiments of the present disclosure. As shown in the figure, the electronic device 500 includes, but is not limited to, components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that a mobile terminal structure shown in FIG. 5 does not constitute a limitation on a mobile terminal, and the mobile terminal may include more or fewer components than shown, or combine some components, or have different component arrangements. In this embodiment of the present disclosure, the mobile terminal includes, but is not limited to, a mobile phone, a tablet computer, a laptop computer, a palmtop computer, an in-vehicle terminal, a wearable device, a pedometer, and the like.

Optionally, a computer program is stored in the memory 509 and is executable on the processor 510. The computer program, when executed by the processor 510, implements the following steps: receiving a first touch-control input; acquiring a movement speed of a first target object in response to the first touch-control input, the first target object being a moving object in a photography preview interface; acquiring a target photographic magnification factor set based on the movement speed, the target photographic magnification factor set including a plurality of photographic magnification factors; and taking a plurality of photos based on the target photographic magnification factor set.

In this embodiment of the present disclosure, the target photographic magnification factor set including a plurality of photographic magnification factors is acquired based on the movement speed of the first target object in the photography preview interface, and a plurality of photos are taken based on the target photographic magnification factor set. In this way, as long as the user performs a touch-control input, the electronic device will automatically take photos at a plurality of photographic magnification factors, which avoids missing an optimal photographing timing and enables the user to take satisfactory photos.

It should be understood that, in this embodiment of the present disclosure, the radio frequency unit 501 can be configured to receive and transmit signals in a process of receiving and transmitting information or calls, specifically, to receive downlink data from a base station, then transmit the downlink data to the processor 510 for processing, and additionally, transmit uplink data to the base station. Generally, the radio frequency unit 501 includes, but is not limited to, an antenna, at least one amplifier, a transceiver, a coupler, a low noise amplifier, a duplexer, and the like. In addition, the radio frequency unit 501 can further communicate with a network device and other devices via a wireless communication system.

The mobile terminal provides wireless broadband Internet access to the user through the network module 502, such as helping the user to send and receive emails, browse web pages, and access streaming media.

The audio output unit 503 can convert audio data received by the radio frequency unit 501 or the network module 502 or audio data stored in the memory 509 into an audio signal and output the audio signal as sound. Moreover, the audio output unit 503 can further provide audio output related to a specific function performed by the electronic device 500 (for example, call signal reception sound, and message reception sound). The audio output unit 503 includes a speaker, a buzzer, a receiver, and the like.

The input unit 504 is configured to receive audio or video signals. The input unit 504 may include a graphics processing unit (GPU) 5041 and a microphone 5042, and the graphics processing unit 5041 processes image data of still images or videos obtained by an image capture device (for example, a camera) in a video capture mode or an image capture mode. The processed image frames may be displayed on the display unit 506. Image frames processed by the graphics processing unit 5041 may be stored in the memory 509 (or another storage medium) or sent via the radio frequency unit 501 or the network module 502. The microphone 5042 may receive sound and be able to process such sound as audio data. The processed audio data may be converted to a format output that can be sent to a mobile communication base station via the radio frequency unit 501 in a telephone call mode.

The electronic device 500 further includes at least one sensor 505, such as an optical sensor, a motion sensor, and other sensors. Specifically, the optical sensor includes an ambient light sensor and a proximity sensor. The ambient light sensor may adjust luminance of a display panel 5061 based on brightness of the ambient light. The proximity sensor may switch off the display panel 5061 and/or backlight when the electronic device 500 is moved to ears. As one type of the motion sensor, an accelerometer sensor may detect a magnitude of acceleration in various directions (generally, on three axes), may detect a magnitude and a direction of gravity when being static, and may be configured to recognize a mobile terminal gesture (such as horizontal and vertical screen switching, a related game, and magnetometer posture calibration), a function related to vibration recognition (such as a pedometer and a knock), and the like. The sensor 505 may further include a fingerprint sensor, a pressure sensor, an iris sensor, a molecular sensor, a gyroscope, a barometer, a hygrometer, a thermometer, an infrared sensor, and the like, and details are not described herein again.

The display unit 506 is configured to display information input by the user or information provided to the user. The display unit 506 may include the display panel 5061, and the display panel 5061 may be configured in the form of a liquid crystal display (LCD), an organic light-emitting diode (OLED), or the like.

The user input unit 507 may be configured to receive input digit or character information, and generate a keyboard signal input related to the user setting and function control of the mobile terminal. Specifically, the user input unit 507 includes a touch panel 5071 and another input device 5072. The touch panel 5071, also referred to as a touchscreen, can collect a touch operation of the user on or near the touch panel (such as an operation of the user on or near the touch panel 5071 by using any suitable object or attachment, such as a finger or a touch pen). The touch panel 5071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 510, and receives and executes a command transmitted by the processor 510. In addition, the touch panel 5071 may be implemented by using various types, such as a resistive type, a capacitive type, an infrared type, and a surface acoustic wave type. In addition to the touch panel 5071, the user input unit 507 may further include the another input device 5072. Specifically, the another input device 5072 may include, but is not limited to, a physical keyboard, a functional key (such as a volume control key or a switch key), a track ball, a mouse, and a joystick, and details are not described herein again.

Further, the touch panel 5071 may cover the display panel 5061. After detecting a touch operation on or near the touch panel 5071, the touch panel 5071 transfers the touch operation to the processor 510, so as to determine a type of the touch event. Then, the processor 510 provides corresponding visual output on the display panel 5061 based on the type of the touch event. Although in FIG. 5, the touch panel 5071 and the display panel 5061 are used as two separate parts to implement input and output functions of the mobile terminal, in some embodiments, the touch panel 5071 and the display panel 5061 may be integrated to implement the input and output functions of the mobile terminal, and details are not described herein again.

The interface unit 508 is an interface for connection between an external device and the electronic device 500. For example, the external device may include a wired or wireless headphone port, an external power (or a battery charger) port, a wired or wireless data port, a memory card port, a port for connecting devices with an identification module, an audio input/output (I/O) port, a video I/O port, a headphone port, and the like. The interface unit 508 may be configured to receive input from the external device (for example, data information and power) and transmit the received input to one or more elements in the electronic device 500, or may be configured to transmit data between the electronic device 500 and the external device.

The memory 509 may be configured to store software programs and various pieces of data. The memory 509 may mainly include a program storage region and a data storage region. The program storage region may store an operating system, an application required by at least one function (for example, a sound playback function and an image playback function), or the like. The data storage region may store data (for example, audio data and a phone book) created based on use of the mobile phone. In addition, the memory 509 may include a high speed random access memory, and may further include a non-volatile memory, such as at least one magnetic disk storage device, a flash memory device or other non-volatile solid state storage devices.

The processor 510 is a control center of the mobile terminal, and connects to various parts of the mobile terminal by using various interfaces and lines. By running or executing the software program and/or module stored in the memory 509, and invoking data stored in the memory 509, the processor performs various functions and data processing of the mobile terminal, thereby performing overall monitoring on the mobile terminal. The processor 510 may include one or more processing units. Optionally, the processor 510 may integrate an application processor and a modem processor, where the application processor mainly processes an operating system, a user interface, an application, and the like, and the modem processor mainly processes wireless communication. It can be understood that, the modem processor may not be integrated into the processor 510.

The electronic device 500 may further include the power supply 511 (such as a battery) for supplying power to the components. Optionally, the power supply 511 may logically connect to the processor 510 by using a power supply management system, thereby implementing functions such as charging, discharging, and power consumption management, by using the power supply management system.

In addition, the electronic device 500 includes a number of functional modules that are not shown, and details are not described herein again.

An embodiment of the present disclosure further provides a computer-readable storage medium, storing a computer program. When executed by a processor, the computer program implements various processes of an embodiment of the account management method, and the same technical effect can be achieved. In order to avoid repetition, details are not described herein again. The computer-readable storage medium is, for example, a read-only memory (ROM), a random access memory (RAM), a magnetic disk, or an optical disc.

It should be noted that, in this specification, the terms "include", "comprise", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Without further limitation, the element defined by a phrase "include a/an . . . " does not exclude other same elements in the process, method, article or device which includes the element.

The foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A photographing method, applied to an electronic device, the method comprising:
    receiving a first touch-control input;
    acquiring a movement speed of a first target object in response to the first touch-control input, the first target object being a moving object in a photography preview interface;
    acquiring a target photographic magnification factor set based on the movement speed, the target photographic magnification factor set comprising a plurality of photographic magnification factors; and
    taking a plurality of photos based on the target photographic magnification factor set, the plurality of photos being respectively corresponding to the plurality of photographic magnification factors in the target photographic magnification factor set;
    wherein the electronic device comprises a plurality of cameras, and
    the taking a plurality of photos comprises:
    in a case that the movement speed is less than a speed threshold, focusing on a preset focus center to take a photo by a first camera; and
    in a case that the movement speed is not less than the speed threshold, focusing on the first target object to take a photo by the first camera;
    the first camera being a camera matching the target photographic magnification factor set in the plurality of cameras.

2. The method according to claim 1, wherein the acquiring a target photographic magnification factor set based on the movement speed comprises:
    acquiring, based on a speed range in which the movement speed is located, a target photographic magnification factor set corresponding to the speed range;
    the movement speed being negatively correlated with the number of photographic magnification factors in the target photographic magnification factor set, and the movement speed being negatively correlated with a maximum magnification factor in the target photographic magnification factor set.

3. The method according to claim 1, wherein the acquiring a movement speed of a first target object comprises at least one of the following:
    in a case that there is one moving object, selecting the moving object as the first target object, and acquiring a movement speed of the first target object; and
    in a case that there are a plurality of moving objects, detecting a distance between each of the moving objects and the electronic device, selecting a moving object with a minimum distance from the electronic device as the first target object, and acquiring a movement speed of the first target object.

4. The method according to claim 1, wherein the taking a plurality of photos comprises:
    receiving a second touch-control input in the photography preview interface;
    in response to the second touch-control input, determining a target region based on an input position of the second touch-control input in the photography preview interface; and
    focusing on the target region to take a photo by the first camera.

5. The method according to claim 1, further comprising:
    in a case that the focusing and photographing are performed by the first camera, detecting, by at least one second camera, whether a second target object exists, the second target object being a moving object in the photography preview interface, and a distance between the second target object and the electronic device being less than a distance between the first target object and the electronic device; and
    in a case that the at least one second camera detects the second target object, focusing on the second target object to take a photo by the first camera;
    the second camera being a camera other than the first camera in the plurality of cameras.

6. An electronic device, comprising a processor, a memory, and a program stored on the memory and executable on the processor, the program, when executed by the processor, implementing steps of:
    receiving a first touch-control input;
    acquiring a movement speed of a first target object in response to the first touch-control input, the first target object being a moving object in a photography preview interface;
    acquiring a target photographic magnification factor set based on the movement speed, the target photographic magnification factor set comprising a plurality of photographic magnification factors; and
    taking a plurality of photos based on the target photographic magnification factor set, the plurality of photos being respectively corresponding to the plurality of photographic magnification factors in the target photographic magnification factor set;
    wherein the electronic device comprises a plurality of cameras, and
    the step of taking a plurality of photos comprises:
    in a case that the movement speed is less than a speed threshold, focusing on a preset focus center to take a photo by a first camera; and
    in a case that the movement speed is not less than the speed threshold, focusing on the first target object to take a photo by the first camera;
    the first camera being a camera matching the target photographic magnification factor set in the plurality of cameras.

7. The electronic device according to claim 6, wherein the step of acquiring a target photographic magnification factor set based on the movement speed comprises:
- acquiring, based on a speed range in which the movement speed is located, a target photographic magnification factor set corresponding to the speed range;
- the movement speed being negatively correlated with the number of photographic magnification factors in the target photographic magnification factor set, and the movement speed being negatively correlated with a maximum magnification factor in the target photographic magnification factor set.

8. The electronic device according to claim 6, wherein the step of acquiring a movement speed of a first target object comprises at least one of the following:
- in a case that there is one moving object, selecting the moving object as the first target object, and acquiring a movement speed of the first target object; and
- in a case that there are a plurality of moving objects, detecting a distance between each of the moving objects and the electronic device, selecting a moving object with a minimum distance from the electronic device as the first target object, and acquiring a movement speed of the first target object.

9. The electronic device according to claim 6, wherein the step of taking a plurality of photos comprises:
- receiving a second touch-control input in the photography preview interface;
- in response to the second touch-control input, determining a target region based on an input position of the second touch-control input in the photography preview interface; and
- focusing on the target region to take a photo by the first camera.

10. The electronic device according to claim 6, wherein the program, when executed by the processor, further implements steps of:
- in a case that the focusing and photographing are performed by the first camera, detecting, by at least one second camera, whether a second target object exists, the second target object being a moving object in the photography preview interface, and a distance between the second target object and the electronic device being less than a distance between the first target object and the electronic device; and
- in a case that the at least one second camera detects the second target object, focusing on the second target object to take a photo by the first camera;
- the second camera being a camera other than the first camera in the plurality of cameras.

11. A non-transitory computer-readable storage medium, storing a computer program thereon, the computer program, when executed by a processor of an electronic device, implementing steps of:
- receiving a first touch-control input;
- acquiring a movement speed of a first target object in response to the first touch-control input, the first target object being a moving object in a photography preview interface;
- acquiring a target photographic magnification factor set based on the movement speed, the target photographic magnification factor set comprising a plurality of photographic magnification factors; and
- taking a plurality of photos based on the target photographic magnification factor set, the plurality of photos being respectively corresponding to the plurality of photographic magnification factors in the target photographic magnification factor set;
- wherein the electronic device comprises a plurality of cameras, and
- the step of taking a plurality of photos comprises:
- in a case that the movement speed is less than a speed threshold, focusing on a preset focus center to take a photo by a first camera; and
- in a case that the movement speed is not less than the speed threshold, focusing on the first target object to take a photo by the first camera;
- the first camera being a camera matching the target photographic magnification factor set in the plurality of cameras.

12. The storage medium according to claim 11, wherein the step of acquiring a target photographic magnification factor set based on the movement speed comprises:
- acquiring, based on a speed range in which the movement speed is located, a target photographic magnification factor set corresponding to the speed range;
- the movement speed being negatively correlated with the number of photographic magnification factors in the target photographic magnification factor set, and the movement speed being negatively correlated with a maximum magnification factor in the target photographic magnification factor set.

13. The storage medium according to claim 11, wherein the step of acquiring a movement speed of a first target object comprises at least one of the following:
- in a case that there is one moving object, selecting the moving object as the first target object, and acquiring a movement speed of the first target object; and
- in a case that there are a plurality of moving objects, detecting a distance between each of the moving objects and the electronic device, selecting a moving object with a minimum distance from the electronic device as the first target object, and acquiring a movement speed of the first target object.

14. The storage medium according to claim 11, wherein the step of taking a plurality of photos comprises:
- receiving a second touch-control input in the photography preview interface;
- in response to the second touch-control input, determining a target region based on an input position of the second touch-control input in the photography preview interface; and
- focusing on the target region to take a photo by the first camera.

15. The storage medium according to claim 11, wherein the program, when executed by the processor, further implements steps of:
- in a case that the focusing and photographing are performed by the first camera, detecting, by at least one second camera, whether a second target object exists, the second target object being a moving object in the photography preview interface, and a distance between the second target object and the electronic device being less than a distance between the first target object and the electronic device; and
- in a case that the at least one second camera detects the second target object, focusing on the second target object to take a photo by the first camera;
- the second camera being a camera other than the first camera in the plurality of cameras.

* * * * *